United States Patent
Wang et al.

(10) Patent No.: US 7,443,276 B2
(45) Date of Patent: Oct. 28, 2008

(54) ELECTROMAGNETIC COUPLING GALVANIC ISOLATED DIGITAL OUTPUT CIRCUIT WITH OUTPUT FEEDBACK

(75) Inventors: Chun-Hsiao Wang, Taipei (TW); Yi-Chang Lee, Taipei (TW)

(73) Assignee: Netio Networking Technology, Taipei (TW)

( * ) Notice: Subject to any disclaimer, the term of this patent is extended or adjusted under 35 U.S.C. 154(b) by 665 days.

(21) Appl. No.: 11/215,516

(22) Filed: Aug. 30, 2005

(65) Prior Publication Data

US 2007/0046501 A1 Mar. 1, 2007

(51) Int. Cl.
*H01F 27/28* (2006.01)
(52) U.S. Cl. ........................................................ 336/180
(58) Field of Classification Search .......... 336/180–184, 336/200, 220–222; 361/18, 90
See application file for complete search history.

(56) References Cited

U.S. PATENT DOCUMENTS

| | | | |
|---|---|---|---|
| 4,052,623 A | 10/1977 | Loberg | |
| 4,672,642 A * | 6/1987 | Willis et al. | 377/20 |
| 5,138,515 A | 8/1992 | Bourgeois | |
| 5,206,540 A * | 4/1993 | de Sa e Silva et al. | 307/127 |
| 5,304,863 A | 4/1994 | Cargille | |
| 2006/0221523 A1 * | 10/2006 | Colombi et al. | 361/90 |
| 2006/0285366 A1 * | 12/2006 | Radecker et al. | 363/16 |

* cited by examiner

*Primary Examiner*—Tuyen T. Nguyen

(57) ABSTRACT

A galvanic isolated digital output circuit of a digital system is provided herein, which utilizes an electromagnetic coupling device for galvanically isolating the system side and the output side of the digital output circuit. The digital output circuit contains a system-side driving circuit, an electromagnetic coupling device, and an output-side control circuit. The electromagnetic coupling device contains at least a system-side electromagnetic coupling element, a first output-side electromagnetic coupling element, and a second output-side electromagnetic coupling element. The system-side driving circuit is connected to the system-side electromagnetic coupling element, and takes the ON/OFF digital control signals from the digital system as input to turn on and off its driving to the system-side electromagnetic coupling element. The electromagnetic coupling device converts and transmits the electrical energy from the system side to the output side and thereby provides the working energy to and required by the output control circuit connected to the first output-side electromagnetic coupling element. The second output-side electromagnetic coupling element forms a feedback circuit, through which the electrical status at the output side is fed back to the system side via the electromagnetic coupling device.

16 Claims, 7 Drawing Sheets

ELECTROMAGNETIC COUPLING GALVANIC ISOLATED DIGITAL OUTPUT CIRCUIT WITH OUTPUT FEEDBACK

BACKGROUND OF THE INVENTION

1. Field of the Invention

The present invention generally relates to digital systems, and more particularly to the galvanic isolated digital output circuit of digital systems.

2. The Prior Arts

An external load or system under the control of a digital system is usually operated under a high voltage while the controlling digital system is usually operated under a low voltage. The digital output circuit of the digital system, therefore, usually employs a galvanic isolation device to separate itself into a system side which is connected to the low voltage digital system, and an output side which is connected to the external load or system under control. With the galvanic isolation device, the system side and the output side are electrically and galvanic isolated from each other, but the digital control signal from the low voltage digital system could still be transmitted to the output side to control external load or system by the galvanic isolation device.

A conventional galvanic isolated digital output circuit, as shown in FIG. 1a, uses a photo coupler as the galvanic isolation device. Based on the ON/OFF digital control signals from the digital system output, a driving circuit 12 at the system side drives a light emitting device (i.e., the light emitting diode 11) of the photo coupler 10 to emitted light signals (represented by the arrow heads). A light sensing device (i.e., the photo transistor 13) at the output side of the photo coupler 10 detects the light signals and produces electrical signals corresponding to the ON/OFF digital control signal to drive the control circuit 14, which in turn controls the external load or system (i.e., the load 16).

The conventional galvanic isolated digital output circuit has a number of disadvantages. For example, the output side requires the configuration of another galvanic isolated power source 17, in addition to the power source 15 at the system side. Besides, the control circuit at the output side could only function either as a current source or as a current sink to the load, meaning a less flexible applicability in real life.

The galvanic isolation device is, as a matter of fact, a kind of energy conversion device. In addition to the foregoing photovoltaic devices (i.e., photo couplers), other possible means include thermoelectric devices which convert between thermal energy and electrical energy, piezoelectric devices which convert between vibration and electrical energy, and electromagnetic device which convert magnetic energy and electrical energy. One of the most common galvanic electromagnetic conversion devices is the transformer. For example, U.S. Pat. Nos. 4,052,623, 5,138,515, and 5,304,863 all disclose similar designs using a two-winding (one at the primary side and one at the secondary side) transformer to separate the circuit connected to the secondary winding for driving a power switch, and the control signal applied to the primary winding for turning on or off the power switch. Due to the electromagnetic conversion capability of the transformer, the power switch ON/OFF energy was delivered from the primary side and there is no need for the configuration of another galvanic isolated power source at the output side. The reference diagram of U.S. Pat. No. 4,052,623 is included as FIG. 1b as an example, whose details are omitted for simplicity sake.

The foregoing conventional digital output circuits have another major flaw which limits the control signal conversion in one direction from the system side to the output side only. Due to the galvanic isolation between the system side and the output-side, the digital system cannot obtain the output status of the output side, such as whether the external load or system under control responds correctly to the control signals. To achieve such a goal, a feedback circuit comprising another photo coupler, transformer, or similar galvanic isolation device is required, so that the electrical output status of the output side such as its voltage, current, frequency, and whether it is in failure conditions like open-circuited, short-circuited, or overloaded, could be fed back to the system side for the digital system's monitoring. Further more, the digital system would also require the configuration of additional input ports for connecting to the feedback circuit. All of the above increase the cost and wiring difficulty of the digital output circuit and the digital system.

SUMMARY OF THE INVENTION

Accordingly, the major objective of the present invention is to provide a galvanic isolated digital output circuit for digital systems that employs a single galvanic isolation device to achieve simultaneously the isolation of the system side and the output side, the transmission of ON/OFF digital control signals from the system side to the output side, and the feedback of the output status from the output side.

Another objective of the present invention is to provide a galvanic isolated digital output circuit which does not require the configuration of additional power source at the output side, and which could be configured to function as a current source or a current sink to the load easily.

To achieve the foregoing objectives, the digital output circuit proposed by the present invention uses an electromagnetic coupling device as the galvanic isolation device. The electromagnetic coupling device contains at least a system-side electromagnetic coupling element, and at least two output-side electromagnetic coupling elements. Through electromagnetic induction between the system-side and the output-side electromagnetic coupling elements, an electrical signal at the system side causes the production a corresponding electrical signal at the output side, and vice versa.

The galvanic isolated digital output circuit of the present invention contains a system-side driving circuit, an electromagnetic coupling device separating the system side and the output side, and an output-side control circuit. The system-side driving circuit is connected to the system-side electromagnetic coupling element of the electromagnetic coupling device, and takes the ON/OFF control signals from the digital system as input to turn on and off its driving to the system-side electromagnetic coupling element. The electromagnetic coupling device converts and transmits the electrical energy from the system side to the output side and thereby provides the working energy to and required by the output-side control circuit connected to a first output-side electromagnetic coupling element. A second output-side electromagnetic coupling element forms a feedback circuit, through which the electrical status of the output side is fed back to the system-side electromagnetic coupling element when the system-side driving circuit is not driving the system-side electromagnetic coupling element. The system-side driving circuit therefore could learn the output status by sampling the system-side electromagnetic coupling element during intervals when it is not driving the system-side electromagnetic coupling element.

The digital output circuit of the present invention could further contain an output-side protection circuit to guard against overload, short circuit, overvoltage, etc. The output-side protection circuit could also prevent interferences from electromagnetic noises.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

The most significant characteristics of the present invention is the adoption of a bi-directional energy convention device to separate the system side and the output side of a galvanic isolated digital output circuit, converting energy from one form at the system side to another form at the output side, and vice versa. According to the present invention, the bi-directional energy conversion device contains at least a system-side electromagnetic coupling element, a first output-side electromagnetic coupling element, and a second output-side electromagnetic coupling element. The system-side electromagnetic coupling element converts and transmits electrical signals from the system side to the output-side electromagnetic coupling elements. The output-side electromagnetic coupling elements, on the other hand, also convert and transmit electrical signals from the output side to the system side. One typical example of this bi-directional energy conversion is by electromagnetic coupling, which is adopted by the present invention. Please note that the principles of the present invention disclosed below could be applied to similar bi-directional energy conversion devices other than those using electromagnetic coupling.

The most common electromagnetic coupling device is the transformer. Without losing generality, transformers are used as examples to explain the principles, characteristics, and embodiments of the present invention in the following. However, the electromagnetic coupling device specified by the present invention is not limited to transformers only. As transformer is used as the energy conversion device of the present invention, the so-called electromagnetic coupling elements refer to the windings of a transformer.

Figure 1A:
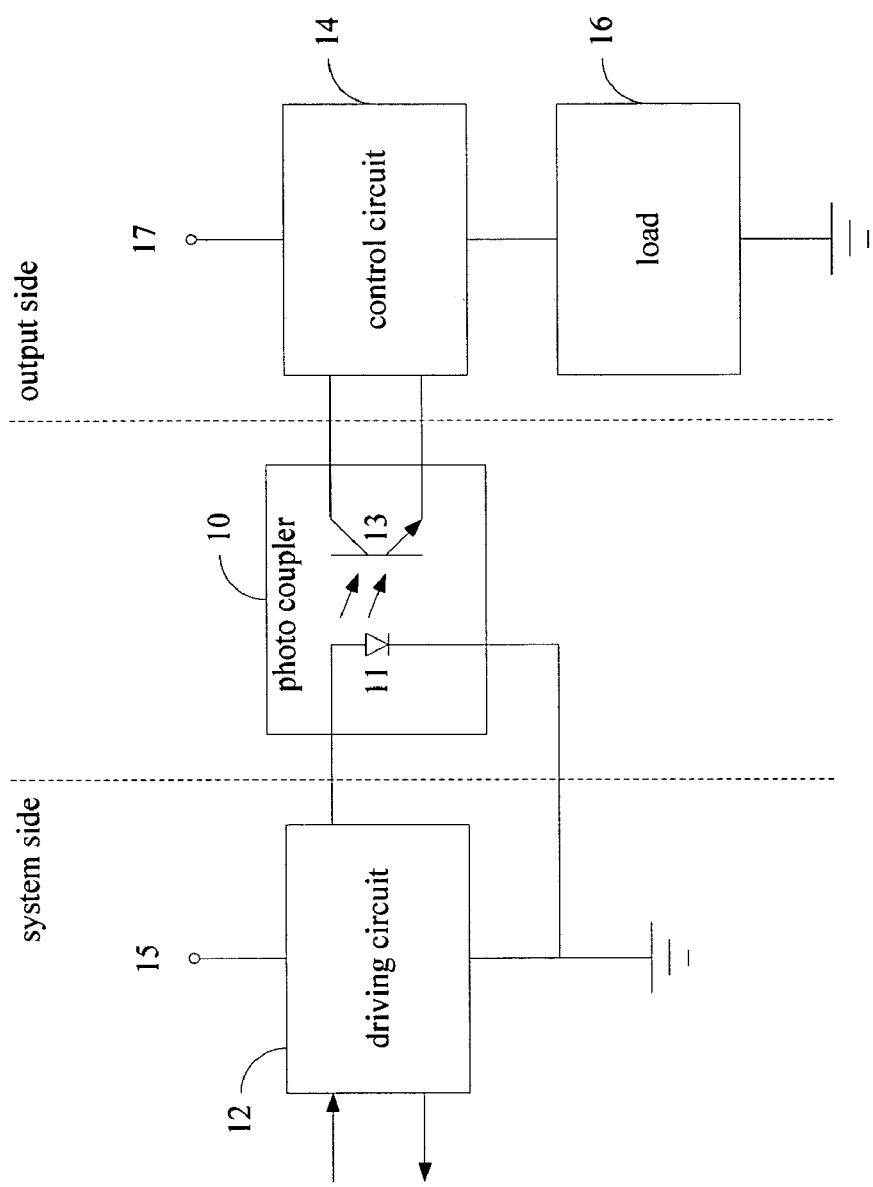
FIG. 1a is a schematic diagram showing a conventional galvanic isolated digital output circuit using a photo coupler as the isolation device.
Figure 1B:
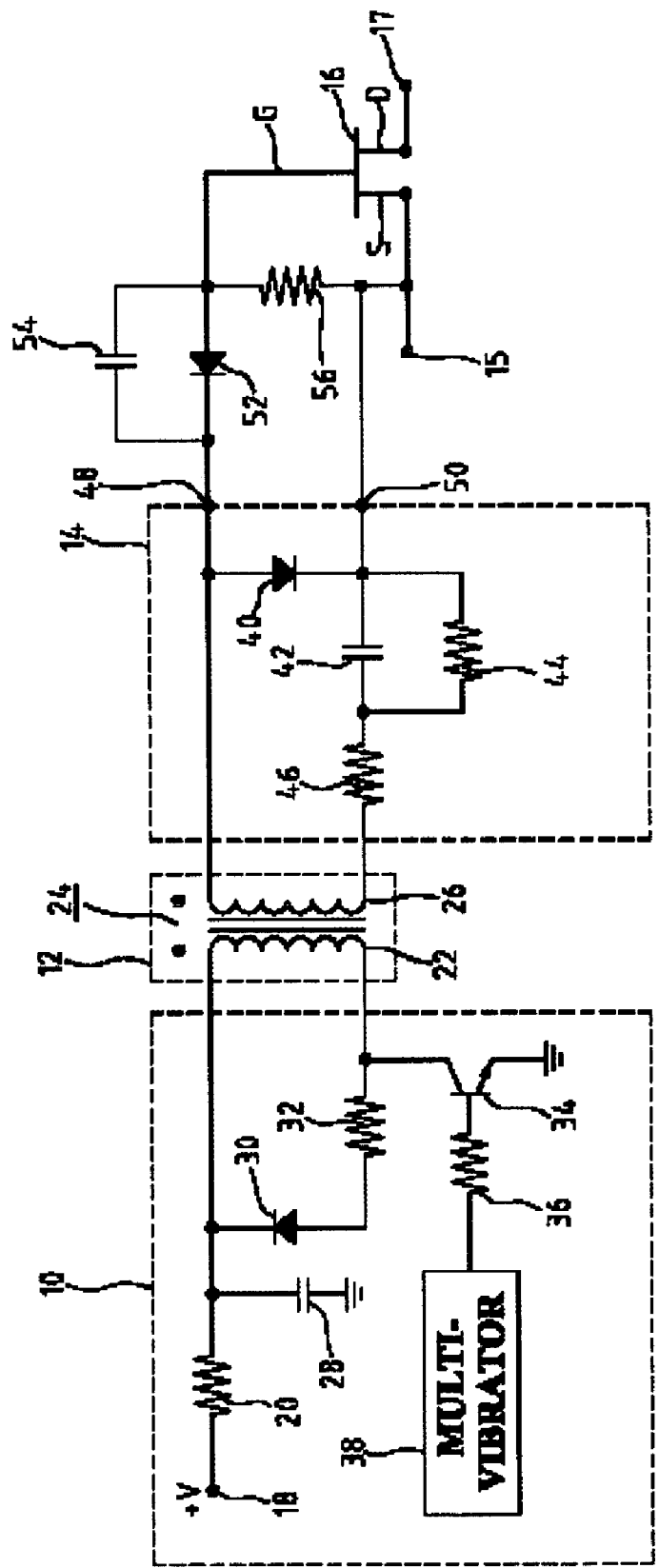
FIG. 1b the reference diagram from U.S. Pat. No. 4,052,623.
Figure 2A:
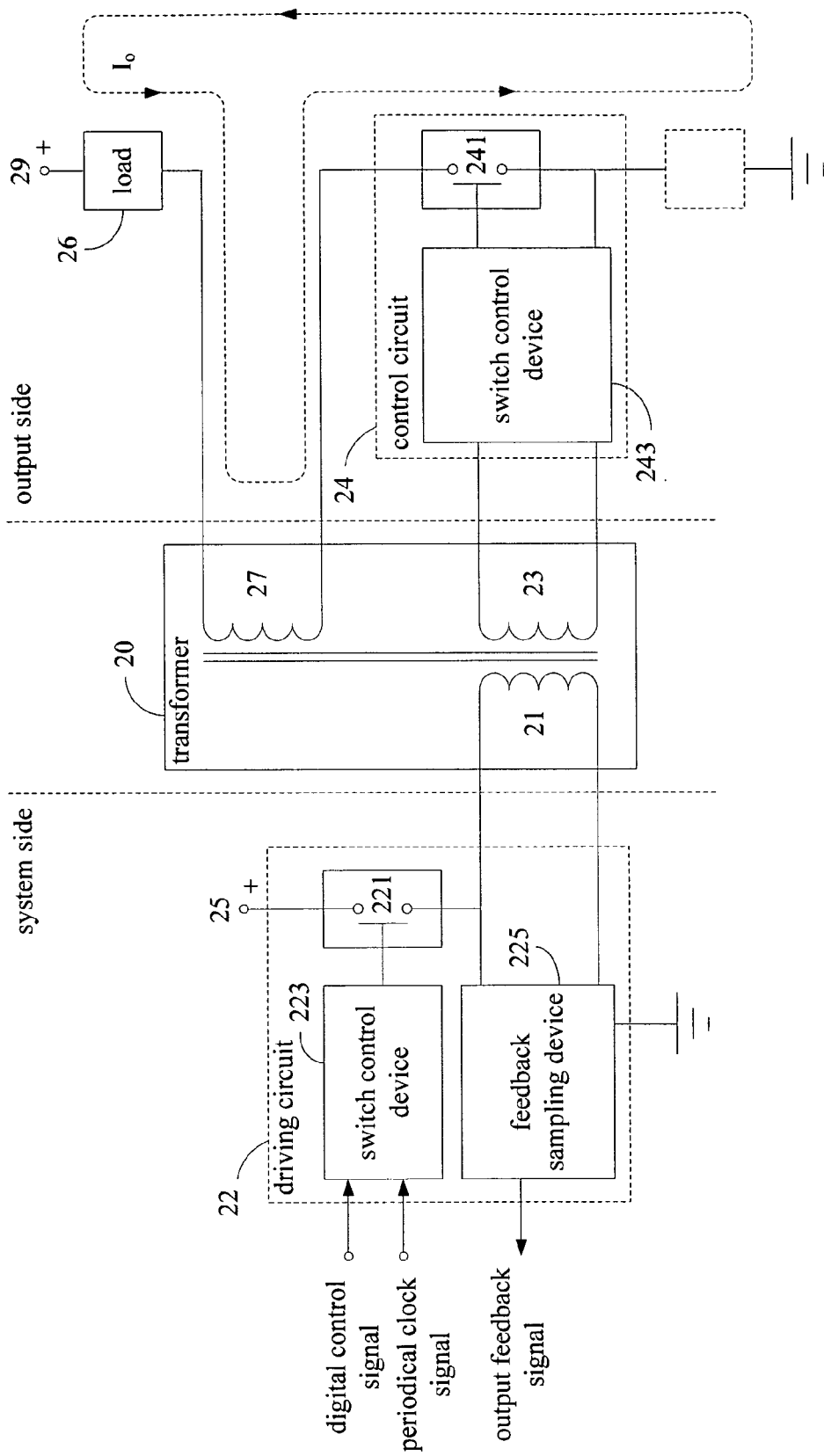
FIG. 2a is a schematic diagram showing a first embodiment of the present invention.

FIG. 2a is a schematic diagram showing a first embodiment of the present invention. As illustrated, the digital output circuit of the present embodiment contains at least a transformer 20, a system-side driving circuit 22, and an output-side control circuit 24. The transformer 20, which isolates the system side and output side, has at least three windings: a system-side winding 21 (i.e., the system-side electromagnetic coupling element) at the primary side of the transformer 20, and a first output-side winding 23 (i.e., the first output-side electromagnetic coupling element) and a second output-side winding 27 (i.e., the second output-side electromagnetic coupling element), both at the secondary side of the transformer 20. Please note that the first and the second output-side windings 23 and 27 are two independent windings of the transformer 20, and the transformer 20 can have more windings to carry out output-side output status feedback.

Figure 3A:
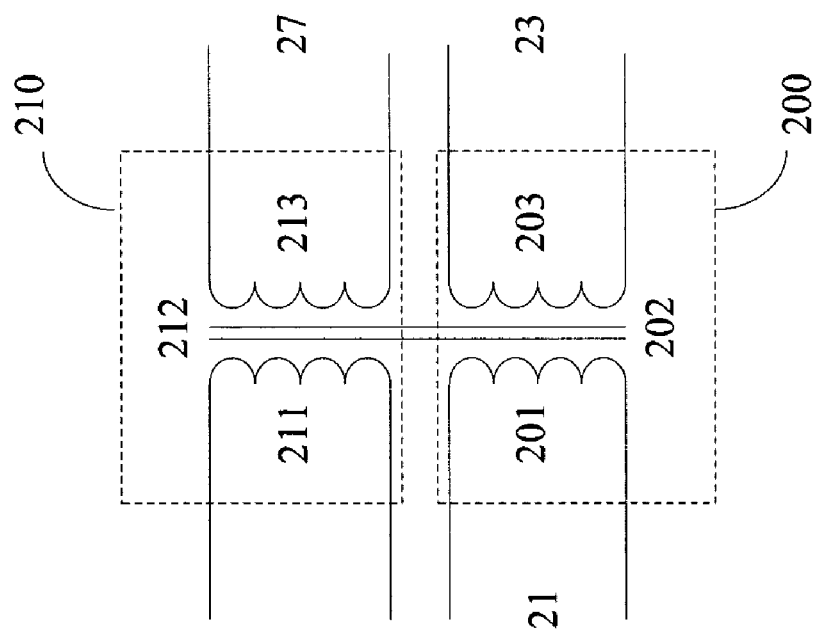
FIG. 3a is a schematic diagram showing an embodiment of the transformer according to the present invention.
Figure 3B:
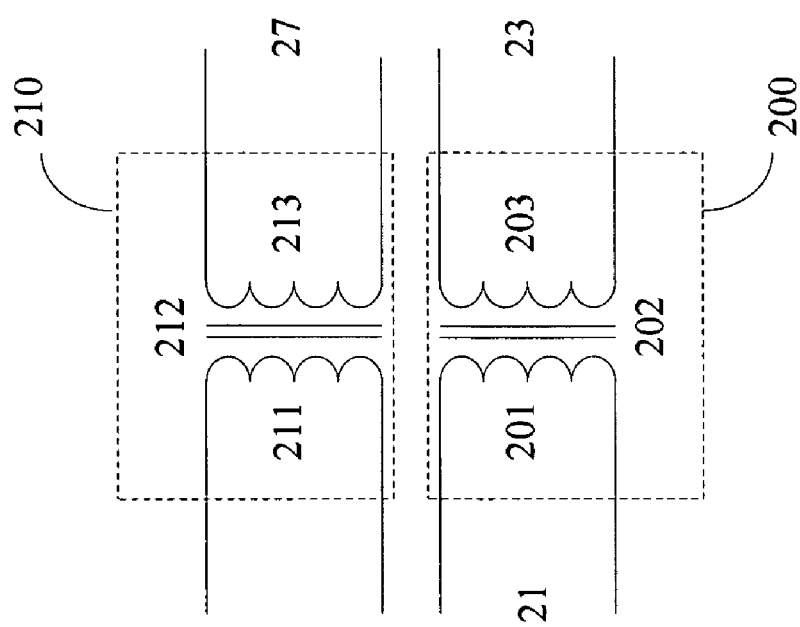
FIG. 3b is a schematic diagram showing another embodiment of the transformer according to the present invention.

The transformer 20 shown in FIG. 2a is a single transformer with three windings. As illustrated in FIG. 3a, the transformer 20 could also be implemented as an assembly of two transformers 200 and 210. The transformer 200 has two windings 201 and 203 around an iron core 202. The transformer 210 also has two windings 211 and 213 around an iron core 212. The two transformers 200 and 210 are assembled with their iron cores 202 and 212 joined together such that their magnetic flux passes through each other. For a transformer 20 constructed this way, the winding 201 is the system-side winding 21, the winding 203 is the first output-side winding 23, and the winding 213 is the second output-side winding 27, with the winding 211 left un-used. FIG. 3b depicts another way of constructing the transformer 20. As shown, the transformer 20 also contains two transformers 200 and 210, but without joining their iron cores 202 and 212 together. Please note that, for the transformer 20 constructed this way, the output-side feedback signal is obtained from the two ends of the winding 211, instead of from the winding 201.

An end (hereinafter the first end) of the system-side winding 21 is connected to the system-side driving circuit 22, while the other end (hereinafter the second end) is connected to a negative end of the internal power source 25, forming a circuit from the positive end of the internal power source 25, through the system-side driving circuit 22 and the system-side winding 21, to the negative end of the internal power source 25. Please note that the connection sequence between the positive and negative ends of the internal power source 25, the system-side driving circuit 22, and the system-side winding 21 is of no significance. In an alternative embodiment, for example, the second end of the system-side winding 21 is connected to system-side driving circuit 22 while the first end of the system-side winding 21 is connected the positive end of the internal power source 25. The principle lies in that the system-side driving circuit 22 and the system-side winding 21 are in a series connection between the positive and negative ends of the internal power source 25.

The system-side driving circuit 22 takes the ON/OFF digital control signal from the digital system to turn on or off its driving to the system-side winding 21. The system-side driving circuit mainly contains a switch device 221, a switch control device 223, and a feedback sampling device 225. The switch device 221 is an electronic switch having three terminals. In the present embodiment, its current output terminal is connected to the first end of the system-side winding 21, its current input terminal is connected the positive end of the internal power source 25, and its control terminal is connected to the output of the switch control device 223. As such, the switch device 221 could be controlled to allow or disallow current flowing from the internal power source 25, through the current input terminal and the current output terminal of the switch device 221, to the system-side winding 21. Please note that, as mentioned earlier, there could be various connection sequences between the internal power source 25, the system-side driving circuit 22, and the system-side winding 21. Therefore, the connection of the switch device 221's terminals would vary accordingly. However, the principle is that the switch device 221 is always configured such that current flows through its input terminal and output terminal, and then into the system-side winding 21, or current flows into system-side winding, and then through its input terminal and output terminal.

The switch control device 223 has two types of input signals: one is the ON/OFF digital control signal from the digital system, and the other one is a periodical clock signal generated by an oscillator (not shown). When the digital control system is ON, the switch control device 223 allows the clock signal to apply on the control terminal of the switch device 221 so that the switch device 221 would short-circuit and open-circuit the conduction path between its current input and output terminals periodically. When the switch device 221 is short-circuited, current flows through the system-side winding 21 and energy is stored inside the system-side winding 12, which is equivalent to an inductor. When the switch device 221 is open-circuited, current will not flow through the system-side winding 21 and the stored energy is released to the output side. The oscillator could be part of the digital system or it could be provided by the digital output circuit of the present invention. Oscillators are quite common to people skilled in the related arts and their details are therefore omitted here.

The feedback sampling device 225 is in a parallel connection with the system-side winging 21. The feedback sampling device 225 allow the digital system to sample the output-side status at appropriate times. More details will be given in the following.

At the output side of the present embodiment, a load circuit (represented by a dashed line) is formed from the positive end of an external power source 29, through a load 26 (which is the external system under the control of the present digital output circuit), the second output-side winding 27, and the output-side control circuit 24, to the negative end of the external power source 29. Please also note that the second output-side winding 27 therefore forms a feedback circuit allowing the load current $I_0$ to flow through. More details will also be given in the following. Please also note that the load 26 could also be located in the dashed box so that the output side of the present embodiment functions as a current source to the load 26 (instead of a current sink as described above). Also, depending on the polarity configuration of the external power source 29, the load current $I_0$ could also flow in a reversed direction.

The output control circuit 24 mainly contains a switch device 241 and a switch control device 243. The switch device 241 is an electronic switch having three terminals. In the present embodiment, its current input terminal is connected to an end of the second output-side winding 27, its current output terminal is connected to the negative end of the external power source 29, and its control terminal is connected to the output of the switch control device 243. By the presence and absence of the control voltage provided by the switch control device 243 to its control terminal, the switch device 241 would short-circuit and open-circuit the conduction path between its current input and output terminals accordingly, which in turn determines whether the load circuit is conductive or open-circuited. Similarly, the connection of the switch device 241's terminals would vary, depending on the polarity arrangement of the external power source 29 and the configuration of the load 26. The principle lies in that current flows through the current input and output terminals of the switch device 241, and then into the load 26, or current flows into the load 26, and then through the current input and output terminals of the switch device 241.

The operation of the present embodiment is described as follows. First, assuming that the digital control signal issued from the digital system is ON, the switch control device 223 allows the periodical clock signal to apply on the switch device 221. Then, the switch device 221 is thereby short-circuited and open-circuited periodically, causing periodical current to flow from the internal power source 25 to the system-side winding 21. Subsequently, due to the electromagnetic coupling effect of the transformer 20, the periodical current at the system-side winding 21 causes the generation of a corresponding periodical voltage across the first output-side winding 23. This periodical voltage drives the switch control device 243 to output an appropriate control voltage to the control terminal of the switch device 241, causing the switch device 241 to be short-circuited and thereby forming a complete and conductive load circuit. Based on similar operation principles, if the digital control signal issued from the digital system is OFF, the switch device 241 and the load circuit would be open-circuited. The process is omitted for simplicity.

Please note that when the digital control signal is ON and a complete and conductive load circuit is formed at the output side, the load current $I_0$ would also flow through the second output-side winding 27. Please also note that the system-side switch device 221 is periodically short-circuited and open-circuited under the application of the clock signal. When the system-side switch device 221 is open-circuited, there is no current flowing from the internal power source 25 through the system-side winding 21. However, the load current $I_0$ flowing through the second output-side winding 27 would induce a corresponding voltage across the system-side winding 21 via the electromagnetic coupling transformer 20. The digital system therefore could learn the status of the load current $I_0$ by sampling the voltage across the system-side winding 21 via the feedback sampling device 225 during the intervals when the system-side switch device 221 is open-circuited by the clock signal. In other words, the present embodiment achieves an effective output feedback by adding an additional winding (i.e., the second output-side winding 27) to a common transformer 20. A side benefit from the second output-side winding 27 is that, when the load current $I_0$ is increased, the control voltage driving the switch device 241 would be increased as well, which is an effect equivalent to the reduction of the switch device 241's turn-on impedance.

If the transformer 20 is implemented as shown in FIG. 3b, since the output-side feedback is provided across the winding 211, the feedback sampling device 225 should be connected to the two ends of the winding 211 and the digital system does not have to wait for the switch device 221 to be open-circuited but could sample the feedback signal at any time via the feedback sampling device 225.

Figure 2B:
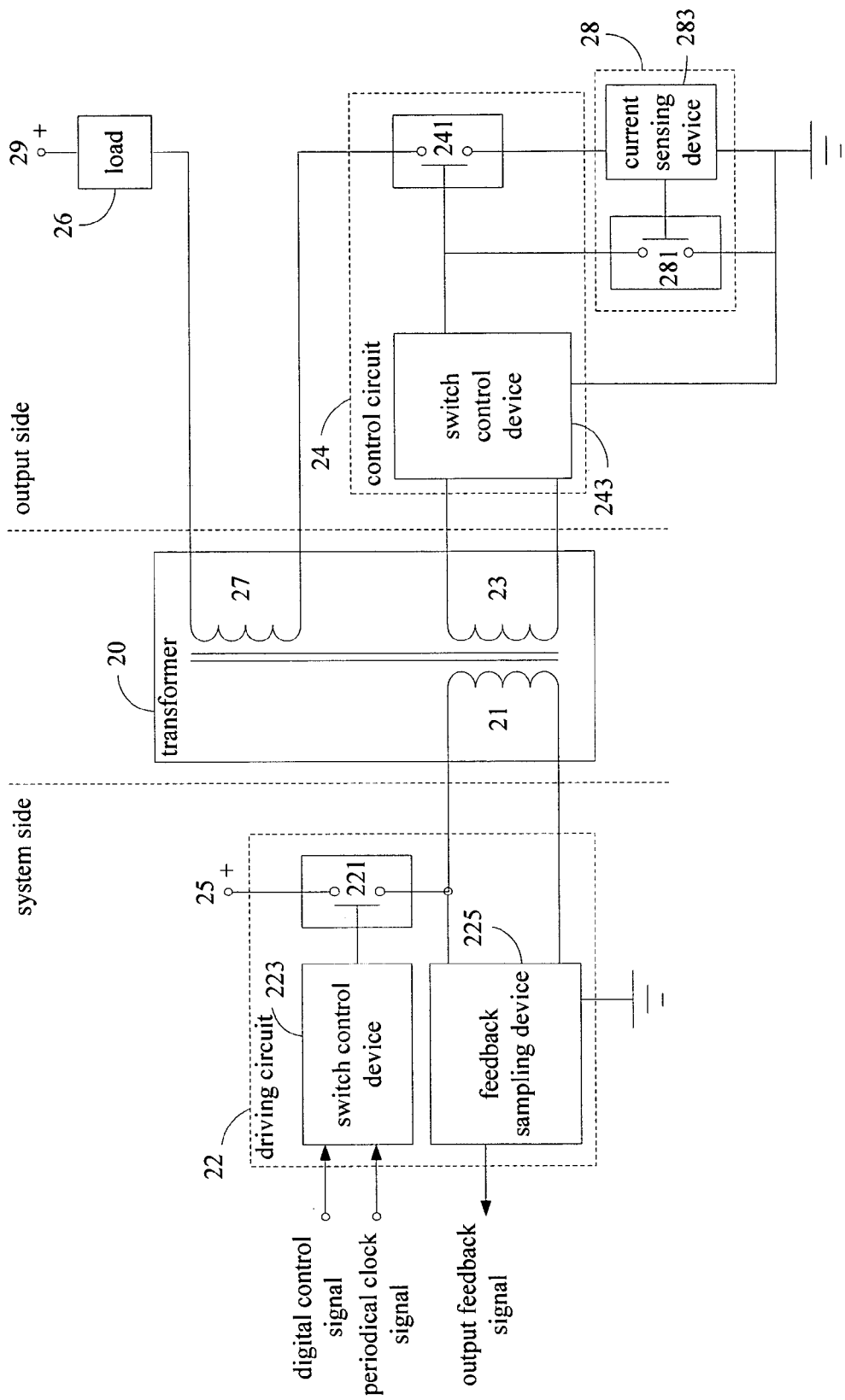
FIG. 2b is a schematic diagram showing a second embodiment of the present invention.

FIG. 2b is a schematic diagram showing a second embodiment of the present invention. As illustrated, the present embodiment is the addition of a protection circuit 28 along the load circuit of the first embodiment, so as to guard against the short circuit of the load circuit and the overloading of the load current $I_0$. The protection circuit 28 contains a current sensing device 283 and a protection device 281. The current sensing device 283 is series-connected to the load circuit and delivers an electrical signal corresponding to the load current $I_0$ to the protection device 281, which is an electronic switch having three terminals. In the present embodiment, its current input terminal is connected to the control terminal of the switch device 241, its current output terminal is connected to the negative end of the external power source 29, and its control terminal is connected to the output of the current sensing device 283. When the load circuit is short-circuited or the load current $I_O$ is overloaded, the current sensing device 283 would deliver a corresponding signal to the control terminal of the protection device 281, causing the protection device 281 to be short-circuited. As such, the control voltage supplied by the switch control device 243 is unable to apply to the control terminal of the switch device 241. The switch device 241 and therefore the load circuit are open-circuited so as to achieve the purpose of protection. Please note that, for ease of description, the present specification describes the protection circuit 28 and the output-side control circuit 24 as two separate circuits. However, in some embodiments, the two circuits could actually be implemented together in a single circuit.

Because the foregoing protection action would lead to a drop in the voltage fed back across the two ends of the system-side winding 21, the digital system could also detects and learns that whether a protection action has taken place at the output side.

Figure 2C:
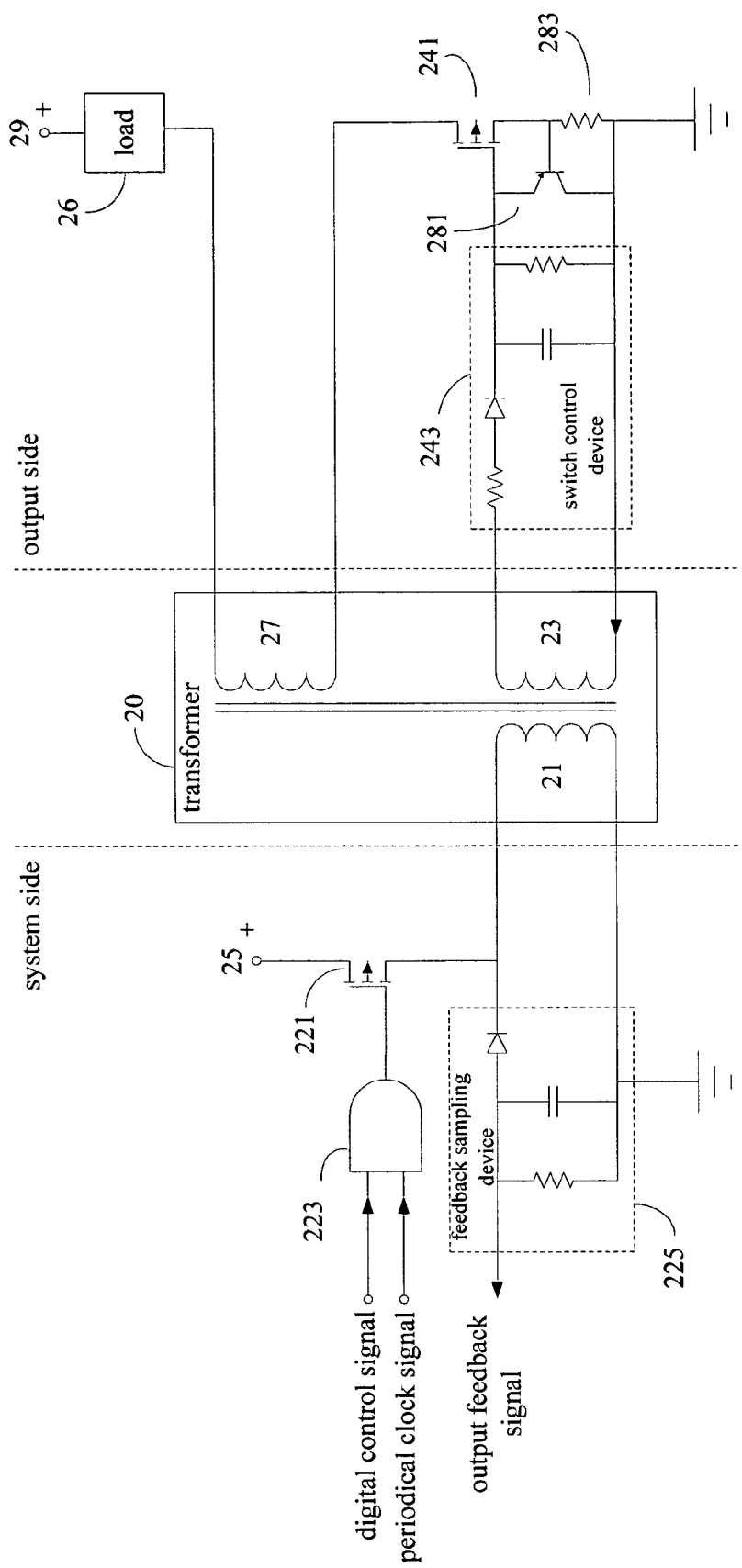
FIG. 2c is a circuit diagram of the second embodiment of FIG. 2b.

To further illustrate how the present invention could be implemented; FIG. 2c is a circuit diagram of the second embodiment of FIG. 2b. As illustrated, the system-side switch device 221 is an electronic switch by a MOSFET transistor. Its source (i.e., the current input terminal) is connected to the positive end of the internal power source 25, its drain (i.e., the current output terminal) is connected to the first end of the system-side wining 21, and its gate (i.e., the control terminal) is connected to the output of the switch control device 223. Please note that the implementation of the switch device 221 is not limited to the MOSFET transistor only. On the other hand, the switch control device 223 is a logic circuit mainly containing a dual-input AND gate. Similarly the implementation of the switch control device 223 is not limited to the AND gate only. The feedback sampling device 225 mainly contains a diode, a resistor, and a capacitor, together forming a low pass sample and hold filter.

At the output side, the switch control device 243 mainly contains a diode, a resistor, and a capacitor, together forming an energy converter. During the switch device 221's periodical short circuit and open circuit, the energy induced and stored in the first output-side winding 23 by the transformer 20 would forward-bias the diode and charge the capacitor so that the energy is transferred to the capacitor, which becomes the energy (i.e., the control voltage) to drive the switch device 241 into short circuit. The output-side switch device 241 is also a MOSFET transistor. The current sensing device 283 is a current-to-voltage element, which is a resistor in the present embodiment. The protection device 281 is a bipolar transistor whose collector is the current input terminal, emitter is the current output terminal, and base is the control terminal. In alternative embodiments, other appropriate electronic elements or devices could be used, instead of those specified above.

It should be clear from FIG. 2c that the present invention requires very simple electronic components and circuit structure while achieving the isolation of the system side and the output side, the delivery of the digital control signals, and the feedback of the output side simultaneously, which conventionally would require a much more complicated circuit. The operation of FIG. 2c has already been covered when the second embodiment of FIG. 2b is explained and should be clear to those skilled in the related arts.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A digital output circuit of a digital system for controlling a load, said digital output circuit comprising:

an electromagnetic coupling device separating said digital output circuit into a system side and an output side, said electromagnetic coupling device comprising a system-side electromagnetic coupling element at said system side, and a first output-side electromagnetic coupling element and a second output-side electromagnetic coupling element, both at said output side, said system-side electromagnetic coupling element transfers an electrical signal of said system-side electromagnetic coupling element to a correspond electrical signal across said first and said second output-side electromagnetic coupling elements, and vice versa;

a system-side driving circuit powered by an internal power source, said system-side driving circuit connected to said system-side electromagnetic coupling element, said system-side driving circuit having a digital control signal from said digital system and a clock signal as input, said system-side driving circuit having a feedback terminal from which said digital system samples a feedback signal corresponding an electrical status of said output side; and an output-side control circuit connecting to said first output-side electromagnetic coupling element in parallel, said output-side control circuit and said second output-side electromagnetic coupling element and said load series-connected between the positive and negative ends of a external power source and thereby forming a load circuit;

wherein, when said digital system outputs an ON digital control signal, said system-side driving circuit causes said internal power source periodically applied to said system-side electromagnetic coupling element, said first output-side electromagnetic coupling element is thereby induced to generate a corresponding electrical signal, said electrical signal drives said output-side control circuit to make said load circuit conductive; and wherein, when said digital system outputs an OFF digital control signal, said system-side driving circuit disengages said internal power source and said system-side electromagnetic coupling element, said first output-side electromagnetic coupling element thereby cannot generates an electrical signal and said load circuit is open-circuited; and wherein, during when said digital system outputs an ON digital control signal and during the periods when said internal power source is not applied to said system-side electromagnetic coupling element, a feedback signal is induced across said system-side electromagnetic coupling element and is sampled by said digital system via said feedback terminal.

2. The digital output circuit according to claim 1, wherein said electromagnetic coupling device is a transformer with at least three windings, said system-side electromagnetic coupling element is a winding at said transformer's primary side, said first and second output-side electromagnetic coupling elements are two independent windings at said transformer's secondary side.

3. The digital output circuit according to claim 1, wherein said electromagnetic coupling device comprises a first transformer having at least two windings and an iron core, and a second transformer having at least two windings and an iron core, said system-side electromagnetic coupling element is a winding at said first transformer's primary side, said first output-side electromagnetic coupling element is a winding at said first transformer's secondary side, said second output-side electromagnetic coupling element is a winding at said second transformer's secondary side, said first and second transformers are assembled with said iron cores of said first and second transformers joined together such that the magnetic flux of said iron cores passes through each other.

4. The digital output circuit according to claim 1, wherein said electromagnetic coupling device comprises a first transformer having at least two windings and an iron core, and a second transformer having at least two windings and an iron core, said first output-side electromagnetic coupling element is a winding at said first transformer's secondary side, said second output-side electromagnetic coupling element is a winding at said second transformer's secondary side, said system-side electromagnetic coupling element comprises a winding at said first transformer's primary side and a winding at said second transformer's primary side, an electrical status of said load circuit induces said feedback signal across said winding at said second transformer's primary side by said winding at the said transformer's secondary side.

5. The digital output circuit according to claim 1, wherein said system-side driving circuit comprises:
   a switch device, said switch device and said system-side electromagnetic coupling element series-connected between the positive and negative ends of said internal power source;
   a switch control device, said switch control device accepting said digital control signal from said digital system and said clock signal to control said switch device; and
   a feedback sampling device, said feedback sampling device connected to said system-side electromagnetic coupling element in parallel, said feedback signal across said system-side electromagnetic coupling element output through said feedback terminal by said feedback sampling device.

6. The digital output circuit according to claim 5, wherein said switch device is an electronic switch having a current input terminal, a current output terminal, and a control terminal, said current input and output terminals are series-connected between the positive and negative ends of said internal power source, and said control terminal is connected to the output of said switch control device.

7. The digital output circuit according to claim 5, wherein said switch control device is a logic circuit, said logic circuit accepts said digital control signal from said digital system and said clock signal as input, the output of said switch control device is connected to said switch device.

8. The digital output circuit according to claim 5, wherein said feedback sampling device is a low-pass sample and hold filter.

9. The digital output circuit according to claim 1, wherein said clock signal is provided by said digital system.

10. The digital output circuit according to claim 1, wherein said clock signal is provided by an oscillator of said system-side driving circuit.

11. The digital output circuit according to claim 1, wherein said output-side control circuit comprises:
    a switch device, said switch device and said second output-side electromagnetic coupling element and said load series-connected between the positive and negative ends of said external power source to form said load circuit; and
    a switch control device, said switch control device connected to said first output-side electromagnetic coupling element in parallel, said switch control device driven by an electrical signal induced across said output-side electromagnetic coupling element to control said switch device.

12. The digital output circuit according to claim 11, wherein switch device is an electronic switch having a current input terminal, a current output terminal, and a control terminal; said current input and output terminals, said second output-side electromagnetic coupling element, and said load are series-connected between the positive and negative ends of said external power source; said control terminal is connected to the output of said switch control device.

13. The digital output circuit according to claim 11, wherein said switch control device is an energy conversion circuit, said energy conversion circuit converts and stores an energy induced across said first output-side electromagnetic coupling element as an energy to required for the conduction of said switch device.

14. The digital output circuit according to claim 11, further comprising:
    a current sensing device, said current sensing device series-connected to said load circuit, said current sensing device delivering an electrical signal corresponding to the current of said load circuit; and
    a protection device, said protection device taking said electrical signal from said current sensing device as input, said protection device connected to said switch control device in parallel so as to control whether a control signal output by said switch control device reaches said switch device.

15. The digital output circuit according to claim 14, wherein said current sensing device is a current-to-voltage element.

16. The digital output circuit according to claim 14, wherein said protection device is an electronic switch having a current input terminal, a current output terminal, and a control terminal; said current input and output terminals are connected to said switch control device in parallel; said control terminal is connected to the output of said current sensing device so as to control whether said control signal output by said switch control device reaches said switch device.

* * * * *